United States Patent [19]
Takahashi et al.

[11] Patent Number: 5,160,812
[45] Date of Patent: Nov. 3, 1992

[54] FLAT WIRE HARNESS ATTACHING UNIT

[75] Inventors: Mineo Takahashi; Susumu Nakayama; Satoshi Suzuki, all of Shizuoka; Akio Mori; Hiroyuki Seo, both of Gotenba; Minoru Imamura, Shizuoka; Hiroshi Tanaka, Shizuoka; Norihiro Yoneyama, Toyota, all of Japan

[73] Assignee: Yazaki Corporation, Tokyo, Japan

[21] Appl. No.: 474,612

[22] Filed: Feb. 23, 1990

Related U.S. Application Data

[62] Division of Ser. No. 55,934, Jun. 1, 1998.

[30] Foreign Application Priority Data

Jun. 4, 1986 [JP] Japan .................. 61-128157
Jun. 4, 1986 [JP] Japan .................. 61-128158
Jun. 4, 1986 [JP] Japan .................. 61-128159
Jun. 24, 1986 [JP] Japan .................. 61-95327
Jun. 24, 1986 [JP] Japan .................. 61-95328
Jun. 24, 1986 [JP] Japan .................. 61-95329
Jun. 24, 1986 [JP] Japan .................. 61-95330
Jun. 25, 1987 [JP] Japan .................. 62-069085

[51] Int. Cl.$^5$ .................. H02G 3/02; H02G 3/26
[52] U.S. Cl. .................. 174/135; 174/72 A; 248/73
[58] Field of Search .................. 174/135, 72 A, 164, 174/40 CC; 24/297, 453, 458; 248/68.1, 71, 73, 74.1, 74.2, 74.3, 74.4, 74.5; 439/34, 567

[56] References Cited

U.S. PATENT DOCUMENTS 3,210,030 10/1965 Ramsey et al.
3,210,032 10/1965 Van Slyke .................. 248/73
3,896,259 7/1975 Fry .................. 174/72 A

FOREIGN PATENT DOCUMENTS 2357728 5/1975 Fed. Rep. of Germany ... 174/72 A

Primary Examiner—Leo P. Picard
Assistant Examiner—Hyung S. Sough
Attorney, Agent, or Firm—Armstrong & Kubovcik

[57] ABSTRACT

A flat wire harness attaching unit for installing a flat wire harness onto a vehicle body. The flat wire harness is composed of a plurality of wires covered with synthetic resin insulation which wires are bundled and united into a flat integral structure by melting the synthetic resin insulation. The wire harness attaching unit has a clip section and an attaching section. The clip section is provided for association with a vehicle body side whereas the attaching section is made of a material capable of being made integral with the synthetic resin insulation through fusion to be secured to one of the surfaces of the flat wire harness. The clip section may be integral with or separate from the attaching section.

11 Claims, 15 Drawing Sheets

FLAT WIRE HARNESS ATTACHING UNIT

This is a divisional application of application Ser. No. 055,934 filed Jan. 1, 1987.

BACKGROUND OF THE INVENTION

The present invention relates to a flat wire harness attaching unit for fixedly attaching a flat wire harness formed by bundling a plurality of wires in a flat shape to the body of an automobile.

Referring to FIGS. 1 and 2, a conventional flat wire harness attaching unit X having a plate member b and a clip member c projecting from the plate member b is bound firmly by means of tapes d to one side of a flat wire harness W' formed by bundling a plurality of parallel wires a in a flat shape and adhesively joining the parallel wires a together.

Such a conventional wire harness attaching unit requires a troublesome taping process for binding the wire harness attaching unit to the flat wire harness and the binding effect of the tapes deteriorates due to the aging of the tapes. Consequently, the flat wire harness attaching unit is unable to hold the flat wire harness in place and the flat wire harness is liable to be moved relative to the body of the automobile by vibrations.

SUMMARY OF THE INVENTION

It is therefore an object of the present invention to provide a flat harness attaching unit capable of being easily and firmly connected to a flat wire harness and securely and durably holding the flat wire harness in place.

In order to achieve the above object, there is essentially provided in one aspect a flat wire harness attaching unit for installing a flat wire harness formed of a plurality of conductors covered with synthetic resin insulation, said plurality of wires being bundled and united into a flat integral structure having a first surface and a second surface by said synthetic resin insulation, said flat wire harness attaching unit comprising a clip section provided for association with a vehicle body side; and an attaching section made of a material capable of being made integral with said synthetic resin insulation through fusion on at least one of said first and second surfaces.

In another aspect, there is essentially provided a flat wire harness attaching unit for installing a flat wire harness formed of a plurality of conductors covered with synthetic resin insulation, said plurality of wires being bundled and united into a flat integral structure having a first surface and a second surface by said synthetic resin insulation, said flat wire harness attaching unit comprising a clip section provided for association with a vehicle body side; an attaching section formed integral with said clip section; and attaching section securing means made of a material capable of being made integral with said synthetic resin insulation of the flat wire harness through fusion and extending beyond the attaching section over at least one of said first and second surfaces of the flat wire harness and to be made integral with said synthetic resin insulation through fusion.

In a further aspect, there is essentially provided a flat wire harness attaching unit for installing a flat wire harness formed of a plurality of conductors covered with synthetic resin insulation, said plurality of wires being bundled and united into a flat integral structure having a first surface and a second surface by said synthetic resin insulation, said flat wire harness attaching unit comprising a clip section provided for association with a vehicle body side; an attaching section formed separate from said clip section and having means for engaging said clip section; and attaching section securing means made of a material capable of being made integral with said synthetic resin insulation of the flat wire harness through fusion and extending beyond the attaching section over at least one of said first and second surfaces of the flat wire harness and to be made integral with said synthetic resin insulation through fusion.

DETAILED DESCRIPTION OF THE PREFERRED EMBODIMENTS

Figure 3:
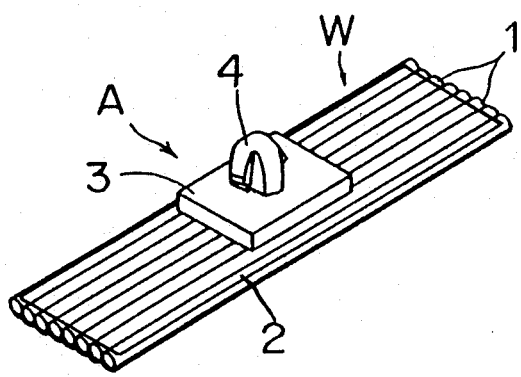
FIG. 3 is a perspective view of one embodiment of the present invention.
Figure 4:
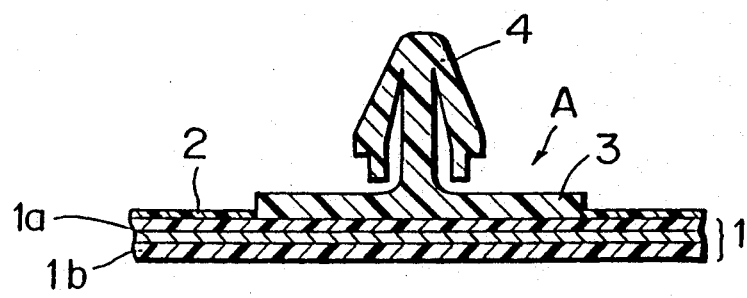
FIG. 4 is a cross section of FIG. 3.

Referring to FIGS. 3 and 4 showing a first embodiment of the present invention, a flat wire harness W is formed by arranging a plurality of parallel wires 1 in a flat state in synthetic resin layers 2. The insulating covering 1b covering the conductor 1a of each wire 1 is formed of polyvinyl chloride. The synthetic resin layers 2 also are formed of polyvinyl chloride. The wires 1 and the synthetic resin layers 2 are joined integrally through fusion.

The flat wire harness attaching unit A comprises a base plate 3 and a clip 4 projecting from the base plate 3, which are formed of polyvinyl chloride in an integral member. The attaching unit A is connected to the surface of the flat wire harness W by heat fusing a portion of the base plate 3, whereas the clip 4 is provided to be attached to the vehicle body.

Figure 5:
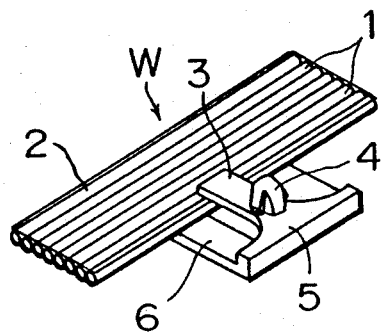
FIG. 5 is a perspective view of another embodiment of the present invention.
Figure 6:
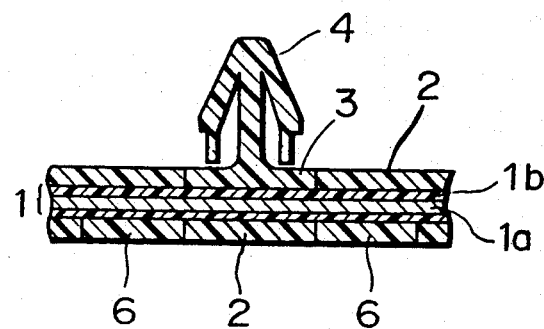
FIG. 6 is a cross section of FIG. 5.

Referring to FIGS. 5 and 6 showing a flat wire harness attaching unit, in another embodiment, according to this invention, a flat wire harness W is formed by binding a plurality of parallel wires in a flat arrangement between synthetic resin films 2. The insulating covering 1b of each wire 1 covering the conductor 1a is formed of polyvinyl chloride and the synthetic resin films 2 are polyvinyl chloride films. The wires 1 and the synthetic resin films 2 are united together through fusion.

The attaching unit A of the flat wire harness attaching unit comprises a base member 3 provided with a clip member 4 projecting therefrom, holding members 6 extending below and along the opposite sides of the base member 3, and a connecting member 5 interconnecting the base member 3 and the holding member 6, which are formed in an integral member of polyvinyl chloride.

As illustrated in FIGS. 5 and 6, the attaching unit A receives the flat wire harness W so as to clamp the flat wire harness W between the base member 3 and the holding members 6. The base member 3 and the holding members 6, which are formed of polyvinyl chloride, are heated to unite the base members 3, the holding member 6 and the synthetic resin films 2 through fusion.

Figure 7:
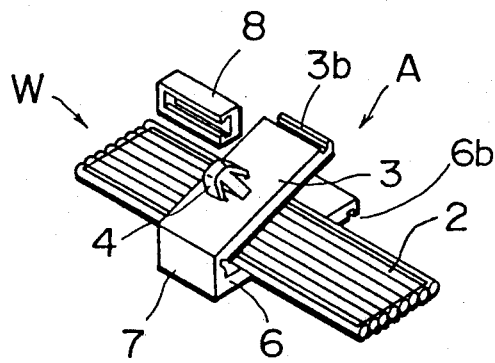
FIG. 7 a perspective view of a further embodiment of the present invention.
Figure 8:
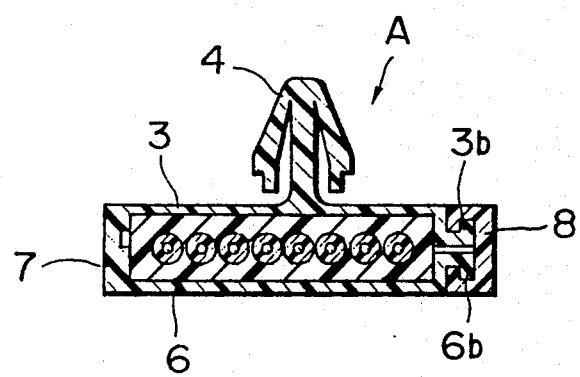
FIG. 8 is a cross section of FIG. 7.

Referring to FIGS. 7 and 8 showing a flat wire harness attaching unit, in a further embodiment, according to this invention, an attaching unit A comprises a base member 3 formed of polyvinyl chloride, a holding member 6 having a hinge section 7 joined to the base member 3, and a fastening member 8. In clamping a flat wire harness W, the flat wire harness W is held between the base member 3 and the holding member 6, then flanges 3b and 6b formed along the side edges of the base member 3 and the holding member 6 are inserted in the dovetail groove of the fastening member 8 to clamp the flat wire harness W between the base member 3 and the holding member 6, and then the attaching unit A is heated to unite the flat wire harness W and the attaching unit A by fusion.

Figure 9:
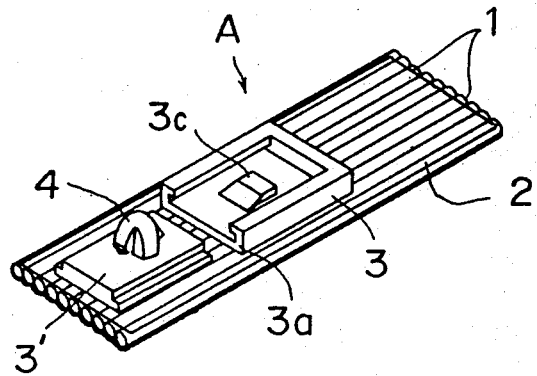
FIG. 9 a perspective view of a still further embodiment of the present invention.
Figure 10:
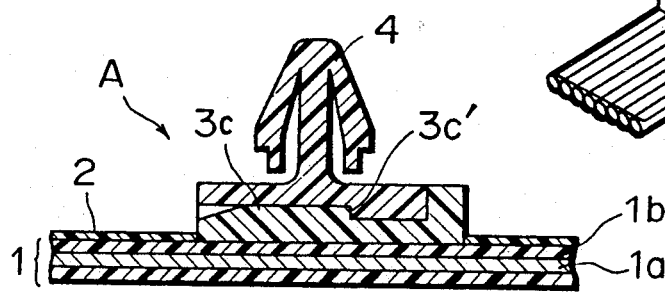
FIG. 10 is a cross section of FIG. 9.

Referring to FIGS. 9 and 10 showing a still further embodiment of the present invention, a flat wire harness attaching unit A comprises a base plate 3 formed of polyvinyl chloride and a clip 4 formed of nylon. A dovetail groove 3a is formed in the upper surface of the base plate 3 and a detaining projection 3c is formed on the bottom surface of the dovetail groove 3a. The bottom surface of the pedestal 3' of the clip 4 is recessed partly to form a shoulder 3c'. The base plate 3 is connected to the flat wire harness W by heating and fusing a portion thereof. The base plate 3 and the clip 4 are combined by inserting the pedestal 3' of the clip 4 into the dovetail groove 3a of the base plate 3 so that the shoulder 3c' of the pedestal 3' engages with the detaining projection 3c of the base plate 3. In this embodiment, the clip 4 can be formed of a material having a high strength and the clip 4 is combined with the base plate 3 in mounting the flat wire harness W on the body of a vehicle. Therefore, only the base plate 3 needs to be attached to the flat wire harness W, which reduces the bulkiness of the flat wire harness and facilitates transportation and storage of the flat wire harness W.

Figure 11:
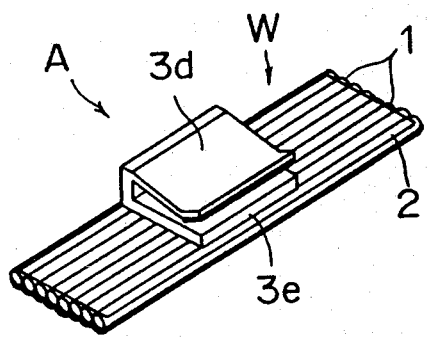
FIG. 11 a perspective view of a still further embodiment of the present invention.
Figure 12:
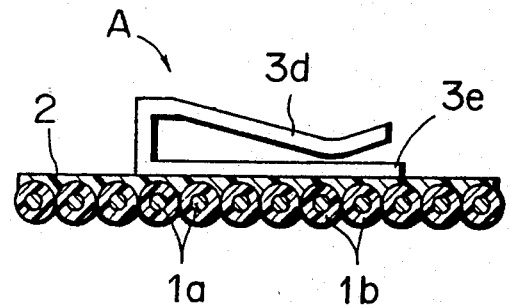
FIG. 12 is a cross section of FIG. 11.

Referring to FIGS. 11 and 12 showing a still further embodiment of the present invention, a flat wire harness attaching gadget comprises an attaching unit A including a base plate $3e$ formed of polyvinyl chloride and an elastic gripping member $3d$ formed of polyvinyl chloride, which are formed in an integral member. The attaching unit A is connected to the flat wire harness W by heating and fusing a portion of the base plate $3e$.

Figure 13:
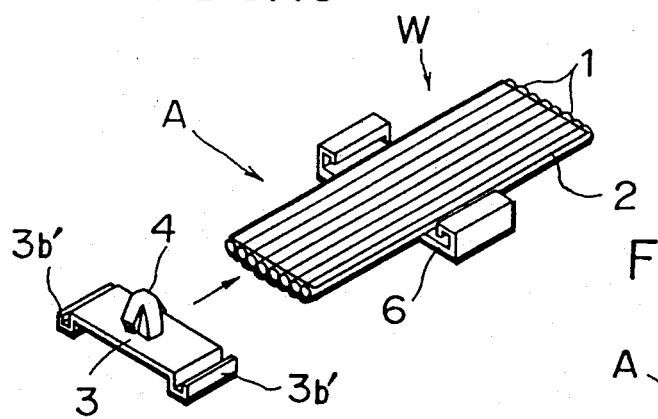
FIG. 13 a perspective view of a still further embodiment of the present invention.
Figure 14:
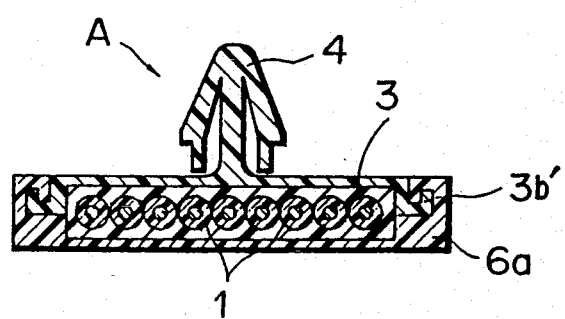
FIG. 14 is a cross section of FIG. 13.

Referring to FIGS. 13 and 14 showing a flat wire harness attaching unit, in a still further embodiment, according to this invention, the attaching unit A comprises a base member 3 provided with a clip member 4 projecting therefrom and formed of a synthetic resin having a comparatively high strength such as, for example, polyacetal or 6-nylon, and a separate holding member 6 formed of polyvinyl chloride. In clamping the flat wire harness W between the base member 3 and the holding member 6, the holding member 6 is placed on the backside of the flat wire harness W, and then the base member 3 is joined to the holding member 6 by combining channel sections $3b'$ formed along the opposite side edges of the base member 3 and channel sections $6a$ formed along the opposite side edges of the holding member 6. Then, the holding member 6 is heated to unite the holding member 6 and the flat wire harness W through fusion.

Figure 15:
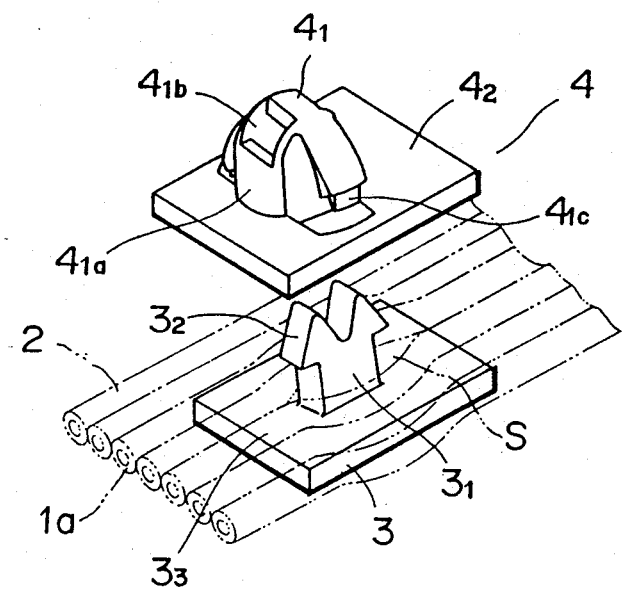
FIG. 15 a perspective view of a still further embodiment of the present invention.
Figure 17:
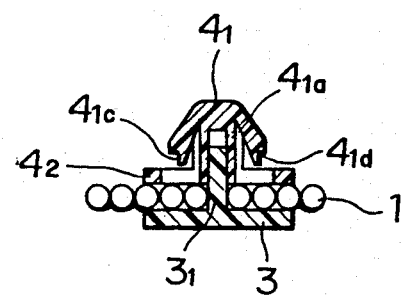
FIGS. 16 and 17 are cross sections of FIG. 15.
Figure 16:
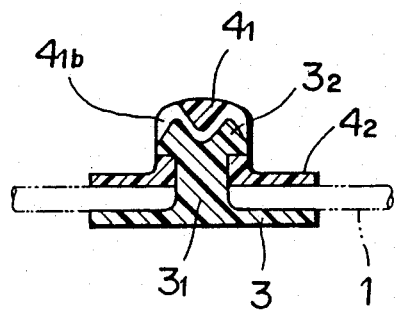

Referring to FIGS. 15 through 17, a flat wire harness attaching device of the invention includes an attaching section 3 and a clip section 4; said attaching section 3 is generally formed of an insulating synthetic resin and has therein a retaining member $3_1$ and a base plate $3_3$ on which said retaining member $3_1$ is erected, whereas said clip section 4 is again generally formed of an insulating synthetic resin and has therein a clip member $4_1$, a base plate $4_2$, a downward hook $4_{1c}$ and a shoulder $4_{1d}$. Said clip section 4 is used for engagement with a hole formed in a panel or the like of the vehicle-body, whereas the retaining member $3_1$ of the attaching section 3 is designed to engage with the cylindrical body $4_{1a}$. In attaching the flat wire clamping device to a flat wire harness W, the retaining member $3_1$ is passed through a slit S formed in the flat wire harness W and is engaged with the clip member $4_1$ to hold the flat wire harness W between the attaching section 3 and clip section 4.

The clip member $4_1$ shown in FIG. 15 is formed so as to act as a catch for catching the retaining member $3_1$ as well as a clip. That is, two holes $4_{1b}$ for receiving two hooks $3_2$ formed by splitting the upper end of the retaining member $3_1$ are formed diametrically at the upper end of the cylindrical body $4_{1a}$ of the clip member $4_1$ which receives the retaining member $3_1$ therein, and downward hooks $4_{1c}$ each having a shoulder $4_{1d}$ are formed at the opposite ends of a diameter, which is perpendicular to the diameter on which the holes $4_{1b}$ are formed, on the outer surface of the cylindrical body $4_{1a}$.

Figure 18:
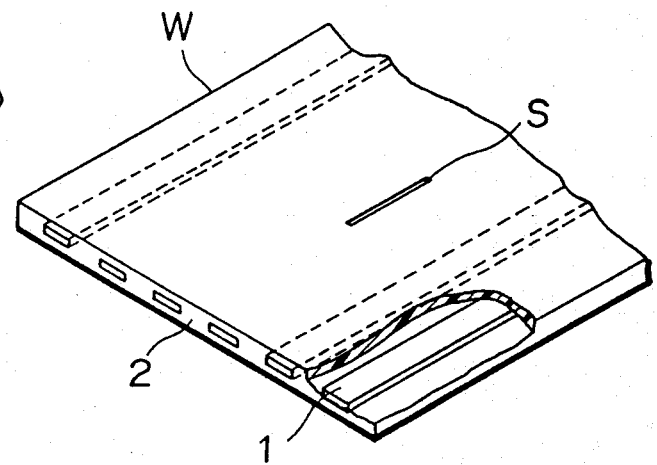
FIG. 18 is a perspective view of another form of flat wire harness.

The flat wire harness W shown in FIG. 15 is formed by connecting together a plurality of insulated wires arranged in parallel in the form of a flat member by dissolving the insulating coverings with a solvent, and by adhesively connecting the insulating coverings with an adhesive or by partly fusing the insulating coverings. The flat wire harness W may be formed by molding the flat arrangement of a plurality of parallel wires 1 such as, for example, conductive strips or conductive wires, in a resin 2 such as, for example as shown in FIG. 18, polyvinyl chloride or polyethylene. The slit S may be formed beforehand in a process of manufacturing the flat wire harness W or may be formed at a desired position in the flat wire harness W with a knife in attaching the clamping device to the flat wire harness W.

As illustrated in FIG. 15, in securing the flat wire harness attaching device of the present invention to a flat wire harness W, the hooks $3_2$ provided on the retaining member $3_1$ are passed through the slit S formed in the flat wire harness W and are inserted into the cylindrical body $4_{1a}$ of the clip member $4_1$ while the retaining member $3_1$ formed of synthetic resin insulation is made integral with the wires 1 covered with the synthetic resin insulation through fusion. Then, the two hooks $3_2$ firmly engage with the holes $4_{1b}$ (FIGS. 16 and 17). Thus, the attaching device can be attached very easily to the flat wire harness W without curving the flat wire harness W and without requiring troublesome taping work.

The flat wire harness W thus attached with the attaching unit can readily be attached to the body of a vehicle by inserting the clip member $4_1$ into a hole formed in the body.

Referring again to FIGS. 15 to 17, a clip member $4_1$ provided on the base plate $4_2$ acts as a member to engage with a retaining member $3_1$ provided on the base plate $3_3$ as well as a clip.

Figure 19A:
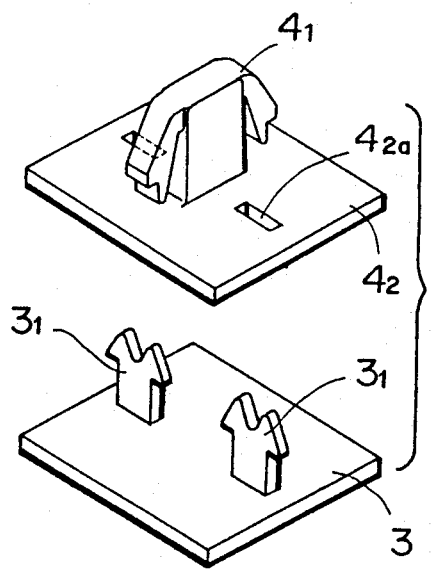
FIGS. 19A and 19B are perspective views of still further embodiments of the present invention.
Figure 19B:
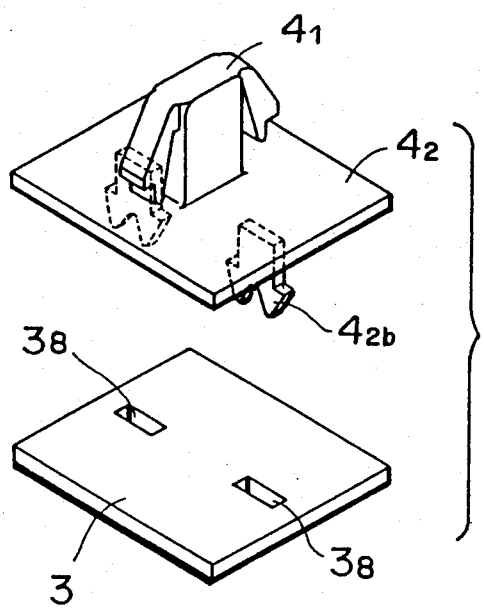

FIGS. 19A and 19B illustrate flat wire harness clamping devices of still further embodiments according to the present invention. Referring to FIG. 19A, a pair of retaining members $3_1$ projects from a base plate $3_3$. Another base plate $4_2$ is provided with a clip member $4_1$ and a pair of slots $4_{2a}$ for receiving the retaining members $3_1$ therethrough. Referring to FIG. 19B, a base plate $4_2$ is provided with a clip member $4_1$ on one side thereof and a pair of retaining members $4_{2b}$ on the other side thereof. A base plate 3, which serves as a attaching member, is provided with a pair of slots $3_8$ for receiving the retaining members $4_{2b}$ therethrough. The flat wire harness clamping devices of FIGS. 19A and 19B can easily clamp a flat wire harness between the attaching base plate 3 and clip member $4_1$ by simply passing the retaining members $3_1$ $4_{2b}$ through slits formed in the flat wire harness and making the base plate 3 integral with the insulation coverings of the wires 1.

Figure 20:
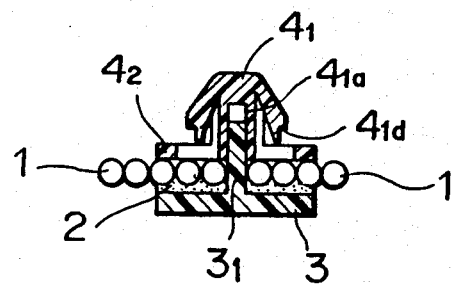
FIG. 20 is a cross section of a still further embodiment of the present invention.

Referring to FIG. 20, a base plate 3 of the attaching section is formed of the same synthetic resin such as, for example, polyvinyl chloride or polyethylene, as that forming the insulating covering (not shown) of the insulated wires 1 of a flat wire harness W. The base plate 3 and the flat wire harness W are joined together by partly fusing or dissolving the base plate 3 and the insulating coverings or by an adhesive. To join the base plate 3 and the flat wire harness W together by partly fusing or dissolving the base plate 3 and the insulating coverings, the base plate 3 and the insulating coverings $1b$ are partly fused by heating or partly dissolved by spraying a solvent. It is preferable to provide an insulating sheet 2 formed of the same synthetic resin as that forming the base plate 3 and the insulating coverings between the base plate 3 and the flat wire harness W so that the thickness of the insulating coverings may not be reduced below an effective thickness. When the attaching member $3_1$ is thus secured to the flat wire harness W, the junction of the attaching member and the flat wire harness W is reinforced, so that neither the flat wire harness is torn at the slit S by an external force exerted to the flat wire harness nor the flat wire harness W is dislocated.

Figure 21:
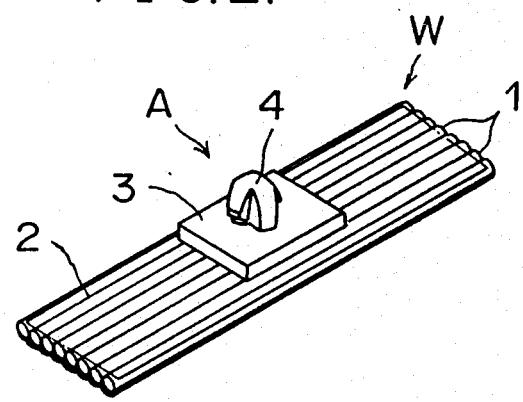
FIG. 21 is a perspective view of a still further embodiment of the present invention.
Figure 22:
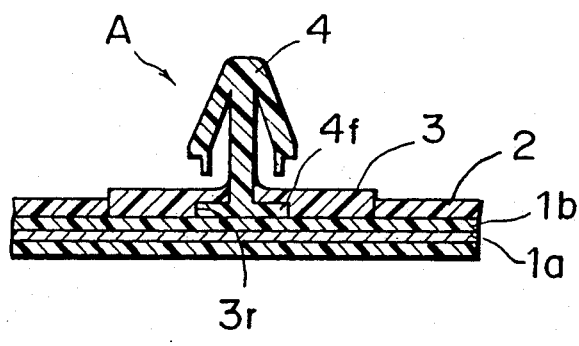
FIG. 22 is a cross section of FIG. 21.

Referring to FIGS. 21 and 22 showing a still further embodiment of the present invention, a flat wire harness W is formed by binding a plurality of parallel wires 1 together in a flat shape with a synthetic resin layer 2. The insulating covering 1b of each wire 1 is formed of polyvinyl chloride and the synthetic resin layer 2 is also formed of polyvinyl chloride. The synthetic resin layer 2 and the wires 1 are united together by fusing part of the synthetic resin layer 2 and part of the insulating coverings 1b of the wires 1.

The flat wire harness attaching unit A includes a base plate 3 and a clip member 4 projecting from the base plate 3. The base plate 3 is formed of polyvinyl chloride, while the clip member 4 is formed of a synthetic resin having a comparatively high strength such as, for example, polyacetal or 6-nylon. The base plate 3 and the clip member 4 are united together by fitting the foot 4f of the clip member 4 in a recess 3r formed in the bottom surface of the base plate 3, and then fusing the foot 4f and the base plate 3 together by high frequency welding.

The attaching unit A is united with the synthetic resin layer 2, namely, polyvinyl chloride layer, by fusing part of the base plate 3.

Figure 23:
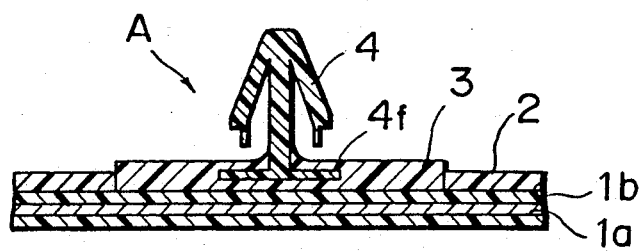
FIG. 23 is a cross section of a still further embodiment.

Referring to FIG. 23 showing a still further embodiment of the present invention, the flat wire harness attaching unit A includes a base plate 3 formed of polyvinyl chloride, and a clip member 4 formed of 6-nylon and having a foot 4f buried in the base plate 3. The attaching unit A is secured to the flat wire harness by fusing part of the base plate 3 in a manner similar to that implemented in the foregoing embodiments.

Figure 24:
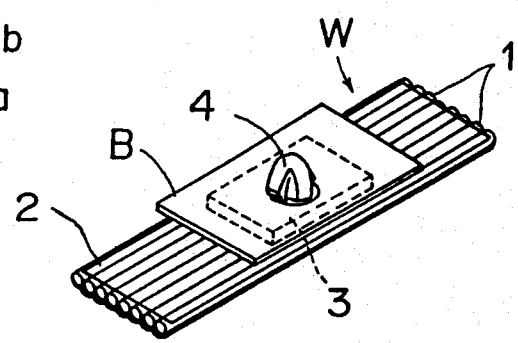
FIG. 24 is a perspective view of a still further embodiment of the present invention.
Figure 25:
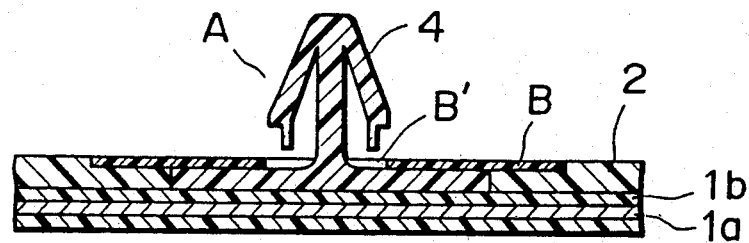
FIG. 25 is a cross section of FIG. 24.

Referring to FIGS. 24 and 25 showing a still further embodiment, a flat wire harness W is formed by binding a plurality of parallel wires 1 together in a flat shape with a synthetic resin layer 2. The insulating covering 1b of each wire 1 is formed of polyvinyl chloride and the synthetic resin layer 2 is also formed of polyvinyl chloride. The synthetic resin layer 2 and the wires 1 are united together by fusing part of the synthetic resin layer 2 and part of the insulating coverings 1b of the wires 1.

The flat wire harness attaching unit A includes a base plate 3 and a clip member 4 projecting from the base plate 3, which are formed of a synthetic resin having a comparatively high strength such as, for example, polyacetal or 6-nylon, in an integral member.

Figure 26:
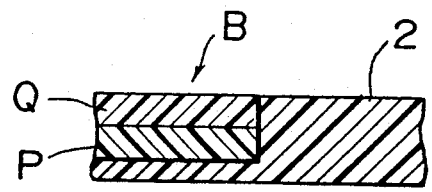
FIG. 26 is an enlarged cross section of a laminated sheet used in the embodiment of FIG. 25.
Figure 28:
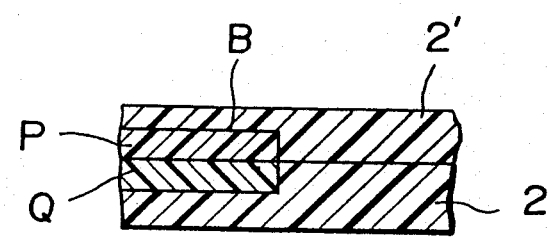
FIG. 28 is an enlarged cross section of a laminated sheet used in the embodiment of FIG. 27.

A laminated sheet B is placed over the base plate 3 of the attaching unit A placed on one side of the flat wire harness W and is joined to the synthetic resin layer 2 by fusing part of the synthetic resin layer 2 and part thereof to secure the base plate 3 to the flat wire harness W. That is, the laminated sheet B is formed by laminating a synthetic resin film Q such as, for example, a polyacetal film or 6-nylon film having a comparatively high strength, and a polyvinyl chloride film P. An opening $B_1$ through which the clip member 4 of the attaching unit A protrudes is formed in the central portion of the laminated sheet B. The laminated sheet B is placed over the synthetic resin layer 2, namely, the polyvinyl chloride layer 2, with the polyvinyl chloride film P in contact with the synthetic resin layer 2 so as to cover the base plate 3 of the attaching unit A, and then part of the synthetic resin film P and part of the synthetic resin layer 2 are fused to bind the laminated sheet B to the flat wire harness W, so that the attaching unit A is secured to the flat wire harness W (FIG. 26).

Figure 27:
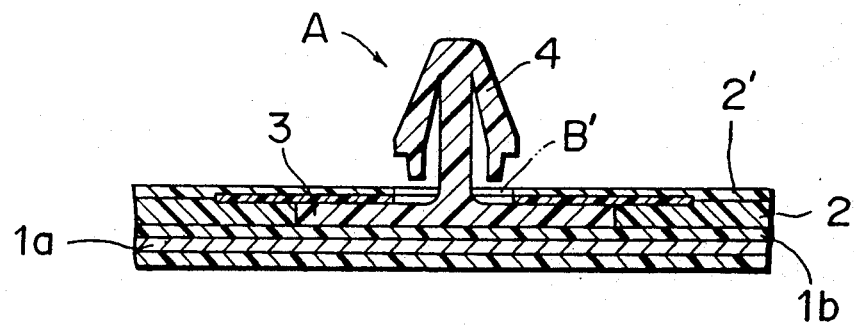
FIG. 27 is a cross section of a still further embodiment of the present invention.

Referring to FIG. 27 showing a flat wire harness attaching gadget in a still further embodiment, the attaching unit A is the same as that of the previous embodiment. In this embodiment, a laminated sheet B has an upper layer formed of a polyvinyl chloride film P and a lower layer formed of a synthetic resin film Q. A further polyvinyl chloride film 2' extends from over the upper synthetic resin film P of the laminated sheet B to therearound. The laminated sheet B is placed on the flat wire harness W so as to cover the base plate 3 of the attaching unit A, and then the portion 2' of the polyvinyl chloride film P extending from over the synthetic resin film Q is fused to the synthetic resin layer 2 of the flat wire harness W, thus securing the attaching unit A to the wire harness.

Figure 29:
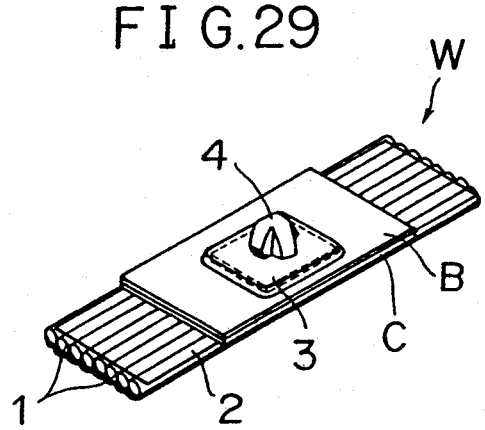
FIG. 29 is a perspective view of a still further embodiment of the present invention.
Figure 31:
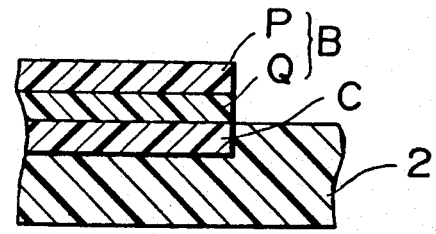
FIG. 31 is an enlarged cross section of a laminated sheet used in the embodiment of FIG. 30.
Figure 30:
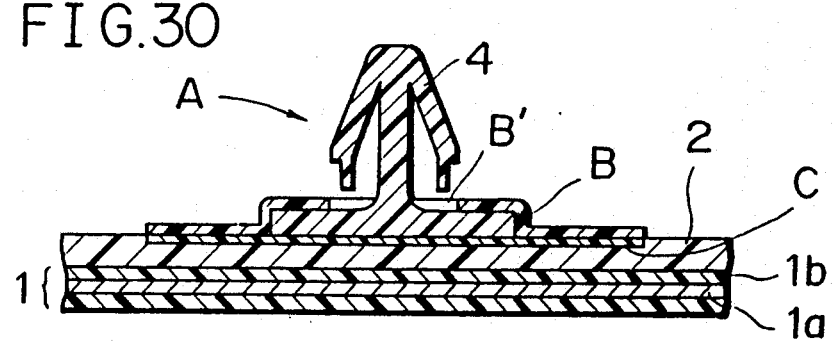
FIG. 30 is a cross section of FIG. 29.

Referring to FIGS. 29 to 31 showing a flat wire harness attaching gadget, in a still further embodiment, an attaching unit A is the same as those of the foregoing embodiments. In this embodiment, the base plate 3 of the attaching unit A is sealed in beforehand between a polyvinyl chloride film C and a laminated sheet B. The assembly of the attaching unit A, the polyvinyl chloride film C and the laminated sheet B is placed on the flat wire harness W, and then the polyvinyl chloride film C and the polyvinyl chloride layer of the flat wire harness W are fused together to secure the attaching unit A to the flat wire harness W.

Figure 32:
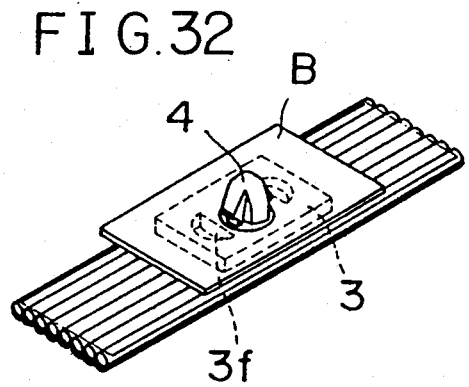
FIG. 32 is a perspective view of a still further embodiment of the present invention.
Figure 34:
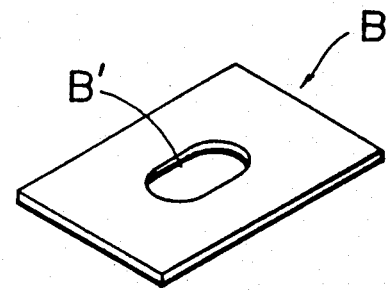
FIG. 34 is a perspective view of a laminated sheet used in the embodiment of FIG. 33.
Figure 33:
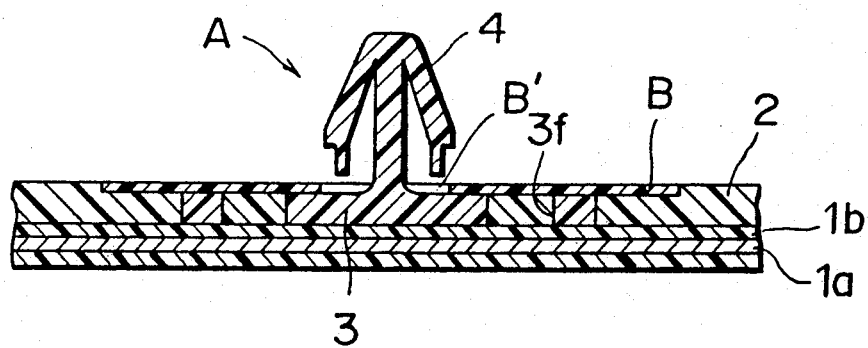
FIG. 33 is an enlarged cross section of FIG. 32.

Referring to FIGS. 32 and 33 showing a still further embodiment, an attaching unit of this embodiment is substantially the same as that of the foregoing embodiment shown in FIGS. 24 and 25 except that through holes 3f are formed in the base plate 3 of the attaching unit. Parts of the polyvinyl chloride layer 2 of the flat wire harness W corresponding to the through holes 3f are fused to the polyvinyl chloride film P of the laminated sheet B to reinforce the attachment of the attaching unit to the flat wire harness. FIG. 34 is a perspective view of the laminated sheet having the opening $B_1$ in the center thereof.

Figure 36:
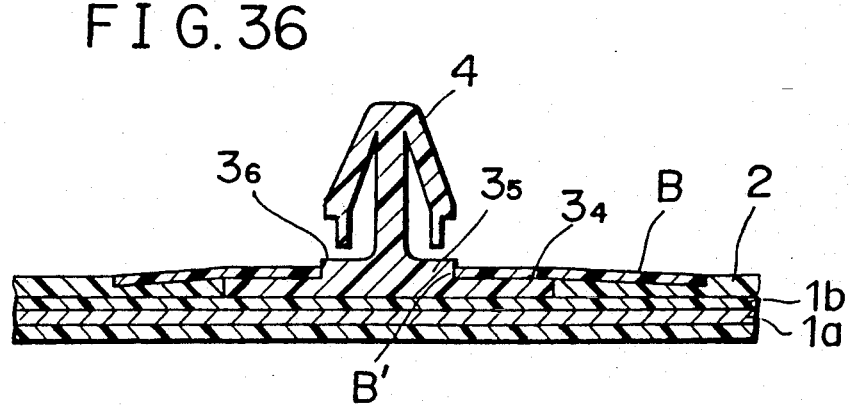
FIG. 36 is a cross section of FIG. 35.
Figure 35:
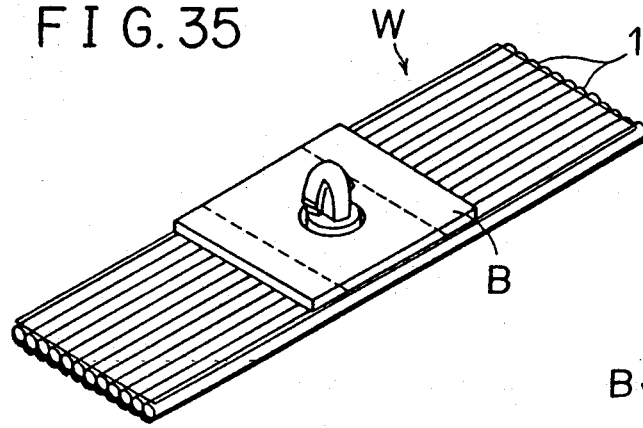
FIG. 35 is a perspective view of a still further embodiment of the present invention.

Referring to FIGS. 35 and 36 showing a still further embodiment, a flat wire harness W is formed by binding a plurality of parallel wires 1 in a flat shape with a synthetic resin film 2. The insulating coverings 1b covering the conductors 1a of the wires 1 are formed of polyvinyl chloride and the synthetic resin film 2 is a polyvinyl chloride film. The wires 1 and the synthetic resin film 2 are united together by fusion.

An attaching unit A includes a plate-shaped base member 34 having a circular protrusion $3_5$ and a clip member 4 projecting from the protrusion $3_5$. The base member 34 is formed of a synthetic resin having a comparatively high strength such as polyacetal or 6-nylon.

The attaching unit A is secured to one side of the flat wire harness W by placing a laminated sheet B over the base member 34, and then joining the laminated sheet B to the synthetic resin film 2 forming the surface of the flat wire harness W by fusion. An upper surface $3_6$ of the protrusion $3_5$ projects above the surface of the laminated sheet B.

Figure 37:
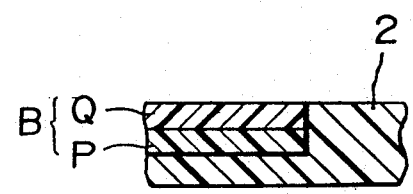
FIG. 37 is a cross section of a laminated sheet used in the embodiment of FIG. 35.

As shown in FIG. 37, the laminated sheet B is formed by laminating a polyvinyl chloride film P and a synthetic resin film Q having a comparatively high strength such as a polyacetal film or a 6-nylon film. The laminated sheet B is provided in the central portion thereof with a circular hole B' for receiving the circular protrusion $3_5$ and the clip member 4 therethrough. The polyvinyl chloride film P is heated so that the laminated sheet B is joined to the flat wire harness W by fusion to secure the attaching unit A to the flat wire harness W.

Figure 38:
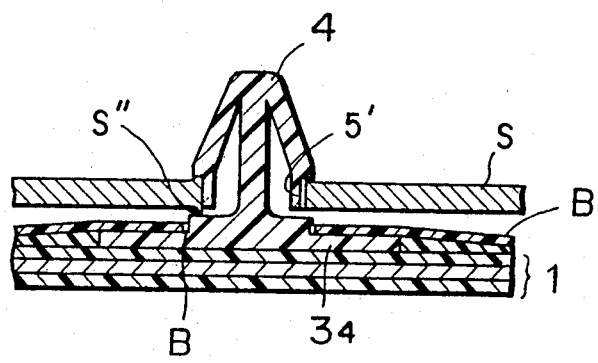
FIG. 38 is a cross section of a still further embodiment of the present invention.

Referring to FIG. 38 showing a manner of attaching the flat wire harness to the body of a vehicle with the flat wire harness attaching unit, when the clip member 4 is inserted in a hole S' formed in a steel plate S, the circular protrusion is brought into abutment with burrs S" projecting from the edge of the hole S', and hence the laminated sheet B is protected from being torn by the burrs S", which prevents the durability of the flat wire harness attaching unit from being deteriorated.

Figure 39:
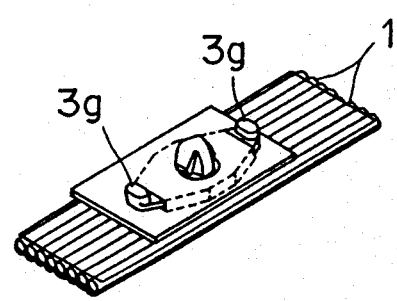
FIG. 39 is a perspective view of a still further embodiment of the present invention.
Figure 40:
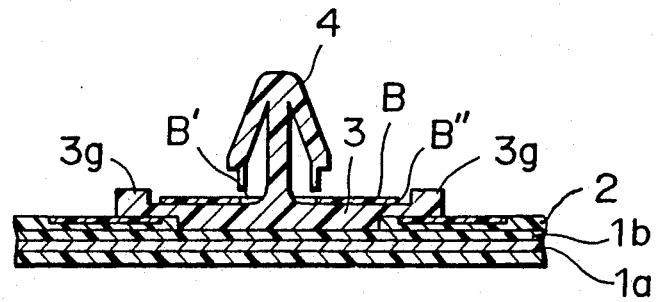
FIG. 40 is a cross section of the embodiment of FIG. 39.

Referring to FIGS. 39 and 40, a still further embodiment is shown, in which the flat wire harness is formed by binding a plurality of conductors 1 with synthetic resin insulation thereon and united into a flat structure by a layer 2 of the synthetic resin insulation. The insulation 1b covering the conductors 1a is formed of polyvinyl chloride as well as said layer 2 of the synthetic resin insulation such that they are fused into an integral continuum.

The attaching unit is composed of a planar base member 3 and a clip 4 erected thereon, both members being integrally formed of an identical synthetic resin material of comparative strength including polyacetal, 6-nylon etc. The attaching unit further includes a laminated sheet B extending over and beyond said base member 3 such that said laminated sheet B is fusion united with the polyvinyl chloride material on the flat wire harness.

Figure 41:
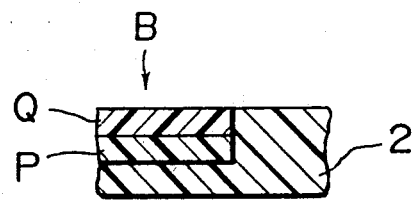
FIG. 41 is a cross section of a laminated sheet used in the embodiment of FIG. 39.
Figure 47A:
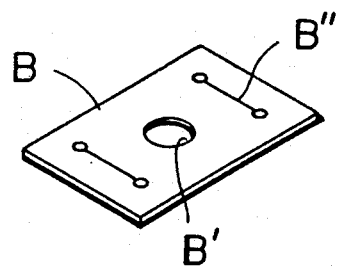
FIGS. 47A and 47B are perspective views of laminated sheets which can be used in the embodiment of FIG. 45.
Figure 47B:
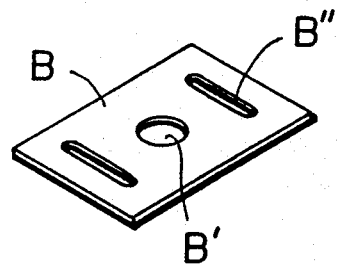

More specifically, the laminated sheet B is composed of, as shown in FIG. 41, a polyvinyl chloride layer P and a layer Q of comparatively strong synthetic resin material including polyethylene, nylon, etc. Further as shown in FIGS. 47A and 47B, said laminated sheet B is formed with a central opening B' for allowing extension of the clip 4 therethrough while slits or slots B" are formed therein on opposite sides of the central opening B' such that a pair of catch members 3g formed at opposite ends of the base member 3 are projected through said slits or slots B". In this way, the base member 3 with the clip 4 thereon is assembled to the laminated sheet B in advance and then the polyvinyl chloride layer P of the laminated sheet B is fusion united to the polyvinyl chloride layer 2 of the flat wire harness W through heat application.

Figure 42:
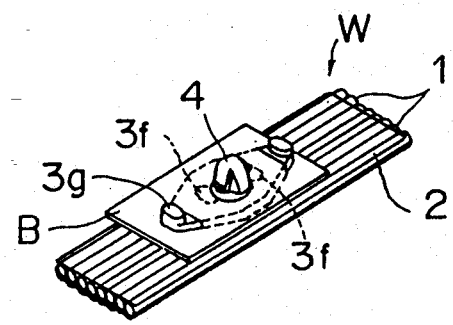
FIG. 42 is a perspective view of a still further embodiment of the present invention.
Figure 43:
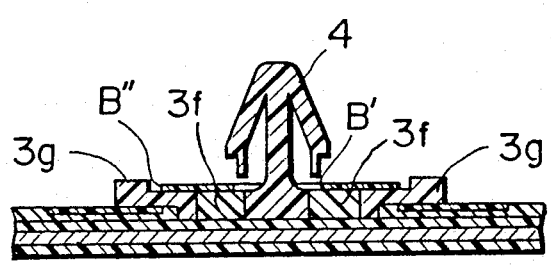
FIG. 43 is a cross section of FIG. 42.

In the modification shown in FIGS. 42 and 43, the base member 3 is formed with apertures 3f therein, through which the polyvinyl chloride layer 2 of the wire harness and the polyvinyl chloride layer P of the laminated sheet are united as a result of fusion thereof, thus enhancing the attaching strength.

Figure 44:
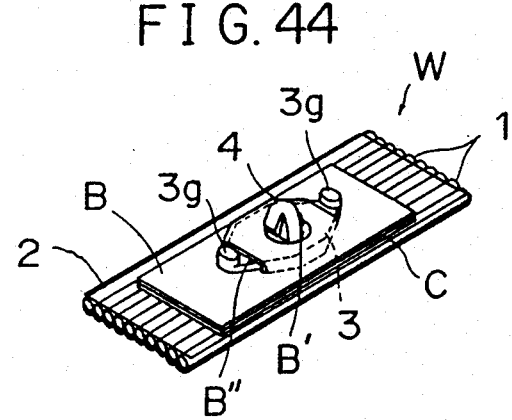
FIG. 44 is a perspective view of a still further embodiment of the present invention.
Figure 46:
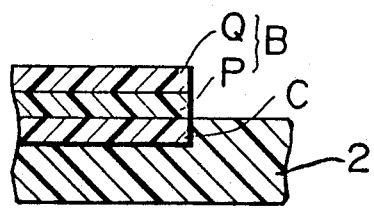
FIG. 46 is an enlarged cross section of a laminated sheet used in the embodiment of FIG. 45.
Figure 45:
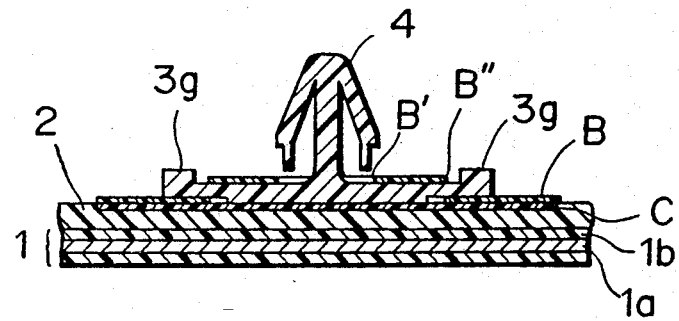
FIG. 45 is a cross section of FIG. 44.

FIGS. 44 through 46 show a still further embodiment of the invention, in which a further polyvinyl chloride sheet C is provided immediately beneath the polyvinyl chloride layer P of the laminated sheet B. The base member 3 of the attaching unit is held between the elevated central portion of the laminated sheet B and the lower peripheral portion thereof, which is then fusion united with said polyvinyl chloride sheet C. The thus assembled members are placed to be fusion united with the polyvinyl chloride layer 2 of the flat wire harness.

Figure 48:
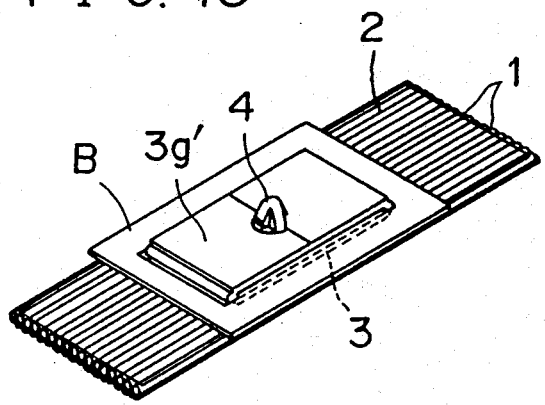
FIG. 48 is a perspective view of a still further embodiment of the present invention.
Figure 49:
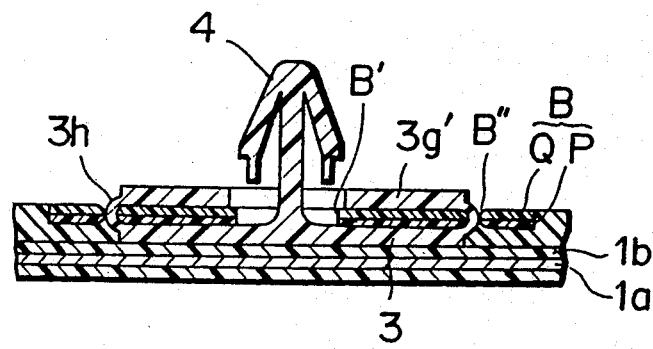
FIG. 49 is a cross section of the embodiment shown in FIG. 48.

Referring to FIGS. 48 and 49 showing a flat wire harness attaching unit in a still further embodiment, a flat wire harness W is formed by binding a plurality of parallel wires 1 arranged in a flat shape with a synthetic resin film 2. The coverings 1b covering the conductors 1a of the wires 1 are formed of polyvinyl chloride and the synthetic resin film 2 is formed also of polyvinyl chloride. The wires 1 and the synthetic resin film 2 are united together by fusion.

An attaching unit A comprising a plate-shaped base member 3 and a clip member 4 projecting therefrom are formed of a synthetic resin having a comparatively high strength such as, for example, polyacetal or 6-nylon in a single member. Foldable cap members 3g' are hinged to the opposite side edges of the base member 3 with hinge members 3h formed integrally with the base member 3, respectively. Projections 3i and recesses 3j, which mate with each other, are formed in the respective free ends of the cap members 3g', respectively, to lock the cap members 3g' in a closed position. Recesses 3k for forming an opening for allowing the clip member 4 to protrude therethrough when the cap members 3g', are closed are formed in the free ends of the cap members 3g', respectively.

Figure 50:
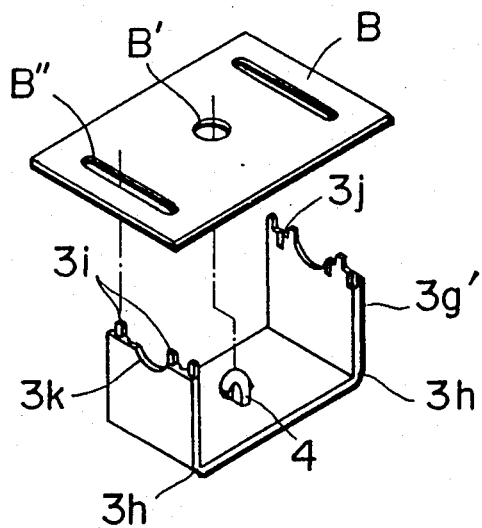
FIG. 50 is an exploded view of the laminated sheet and the wire harness attaching unit.
Figure 51:
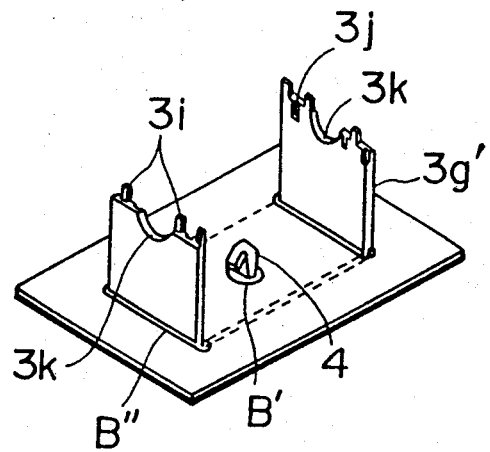
FIG. 51 is a perspective view of the laminated sheet and the wire harness attaching unit of FIG. 50 in the assembled state.

The attaching unit is combined beforehand with a laminated sheet B. The laminated sheet B is formed by laminating a polyvinyl chloride film P and a synthetic resin film Q of a synthetic resin having a comparatively high strength such as, for example, polyethylene or nylon. The laminated sheet B is provided with an opening B' in the central portion thereof and slots B" near the opposite ends thereof. As illustrated in FIGS. 50 and 51, in combining the attaching unit and the laminated sheet B, the clip member 4 is passed through the opening B', the cap members 3g' are passed through the slots B", and then the cap members 3g' are folded over the laminated sheet B.

Then, the laminated sheet B is heated to fuse the polyvinyl chloride film P so that the laminated sheet B and the flat wire harness W are united together to secure the attaching unit A to the flat wire harness W.

Figure 52:
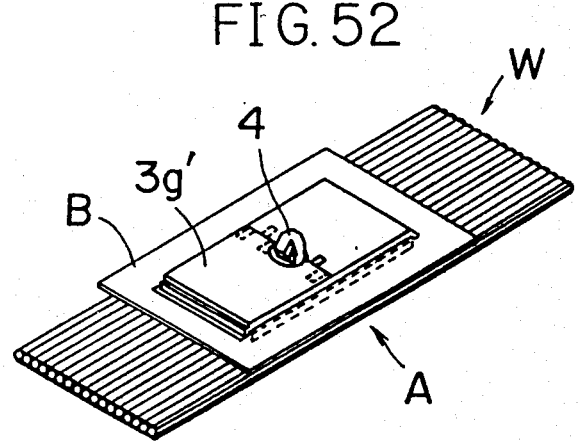
FIG. 52 is a perspective view of a still further embodiment of the present invention.
Figure 53:
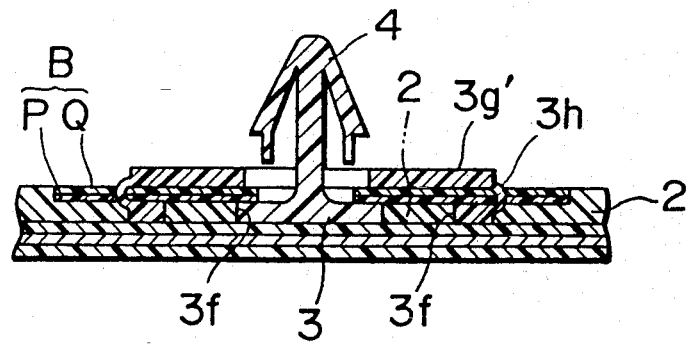
FIG. 53 is a cross section of the embodiment of FIG. 52.
Figure 54:
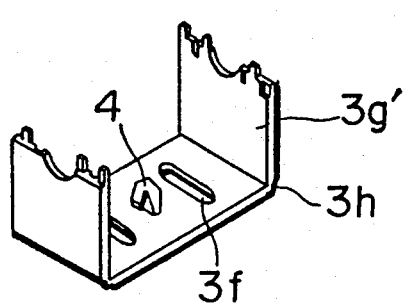
FIG. 54 is a perspective view of a laminated sheet used in the embodiment of FIG. 52.

Referring to FIGS. 52 and 53 showing a flat wire harness attaching unit in a still further embodiment, the attaching unit A has a plate-shaped base member 3, which is similar to the base member of the embodiment shown in FIGS. 48 and 49, provided with through holes 3f to allow portions of the polyvinyl chloride film 2 of the flat wire harness W corresponding to the through holes 3f and portions of the polyvinyl chloride film P of the laminated sheet B to be joined by fusion to enhance the strength of attachment of the attaching unit A to the flat wire harness W.

Figure 55:
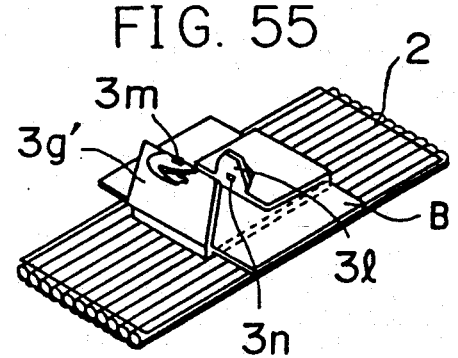
FIG. 55 is a perspective view of a still further embodiment of the present invention.
Figure 56:
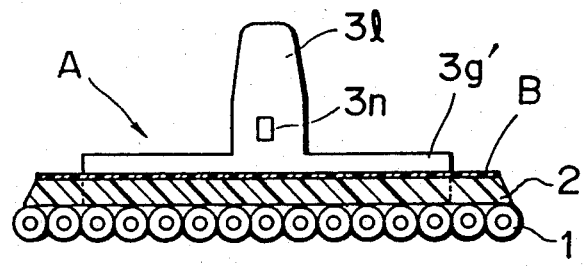
FIG. 56 is a cross section of FIG. 55.
Figure 57:
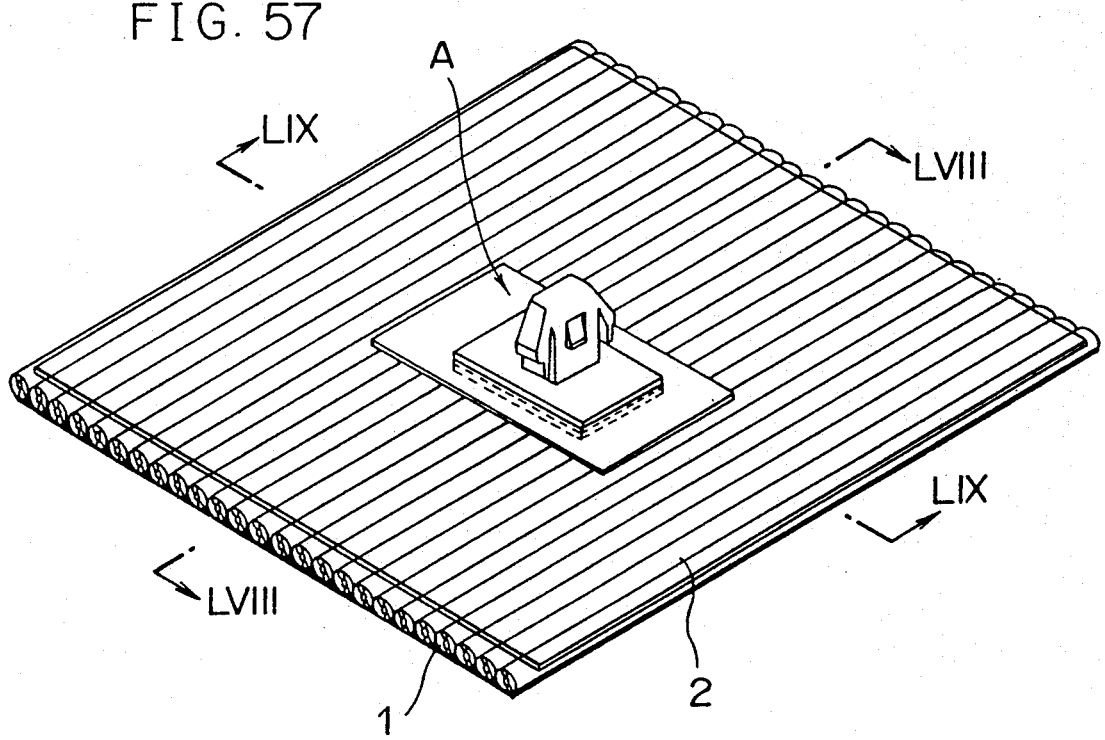
FIG. 57 is a perspective view of a still further embodiment of the present invention.

Referring to FIGS. 55 and 56, a flat wire harness attaching unit, in a still further embodiment is shown in which, an attaching unit A includes a plate-shaped base member 3 integrally provided with foldable cap members 3g' provided at the respective free ends with split clip members 3l which form a clip when joined together. A projection and a recess 3n, which mate with each other, are formed in the opposite surfaces of the split clip members 3l to lock the split clip members 3l when the cap members 3g' are closed.

A laminated sheet B is placed over the base member so as to extend across a direction in which the cap members 3g' are turned for folding to secure the attaching unit A to the flat wire harness W by portions thereof extending from the side edges of the base member.

Referring to FIGS. 57 through 60B, there is shown a still further embodiment of the present invention. A laminated sheet B which has a layer P of the same synthetic resin material as the insulation layer 2 of the flat wire harness is held between the base plate $4_2$ having a clip 4' erected thereon and the attaching base plate 3 having a catch section $3_1$. Due to adhesion of the laminated sheet B and the insulation layer 2, the attaching unit A is secured on one surface of the flat wire harness W.

Figure 58:
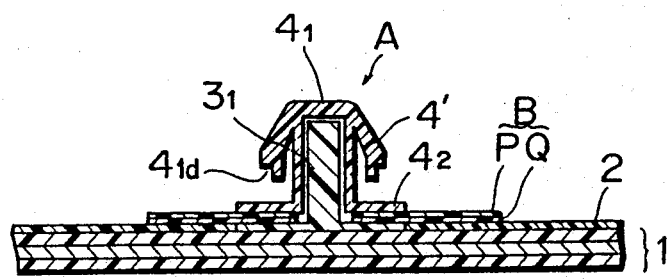
FIGS. 58 and 59 are cross sections taken in the direction of lines LVIII—LVIII and LIX—LIX of the embodiment shown in FIG. 57.
Figure 59:
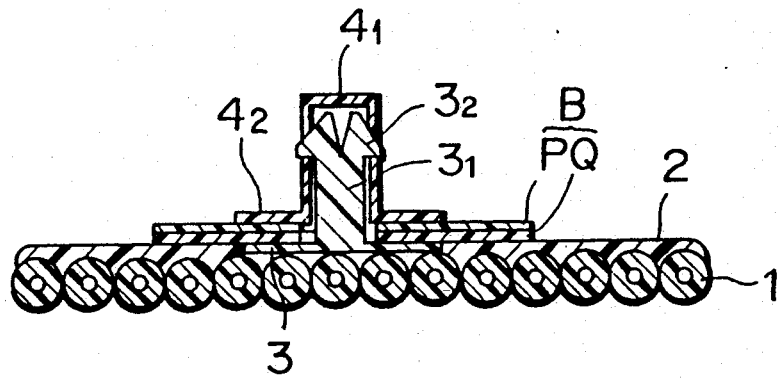
Figure 60:
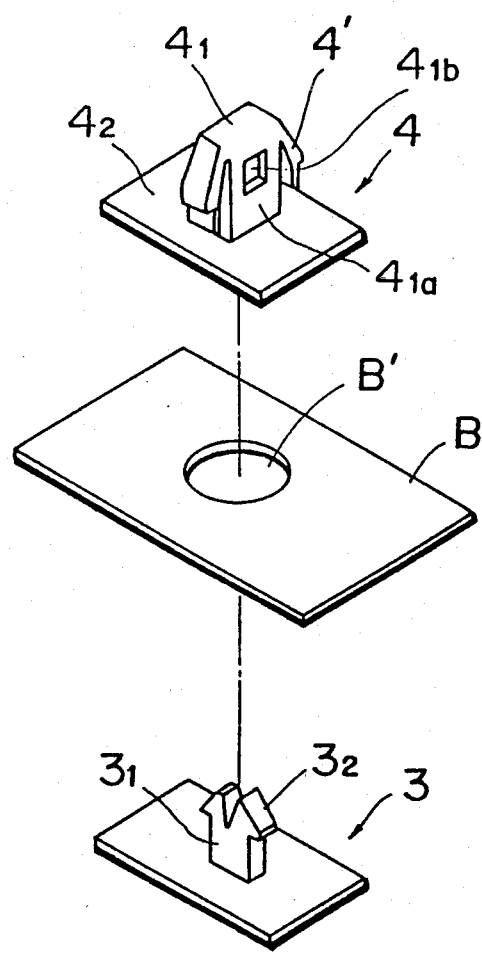
FIGS. 60A and 60B are exploded views of the embodiment shown in FIG. 57.
Figure 60:
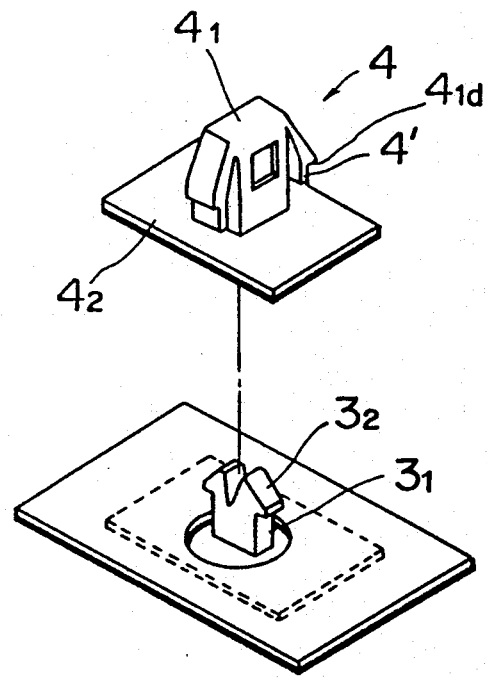
Figure 61:
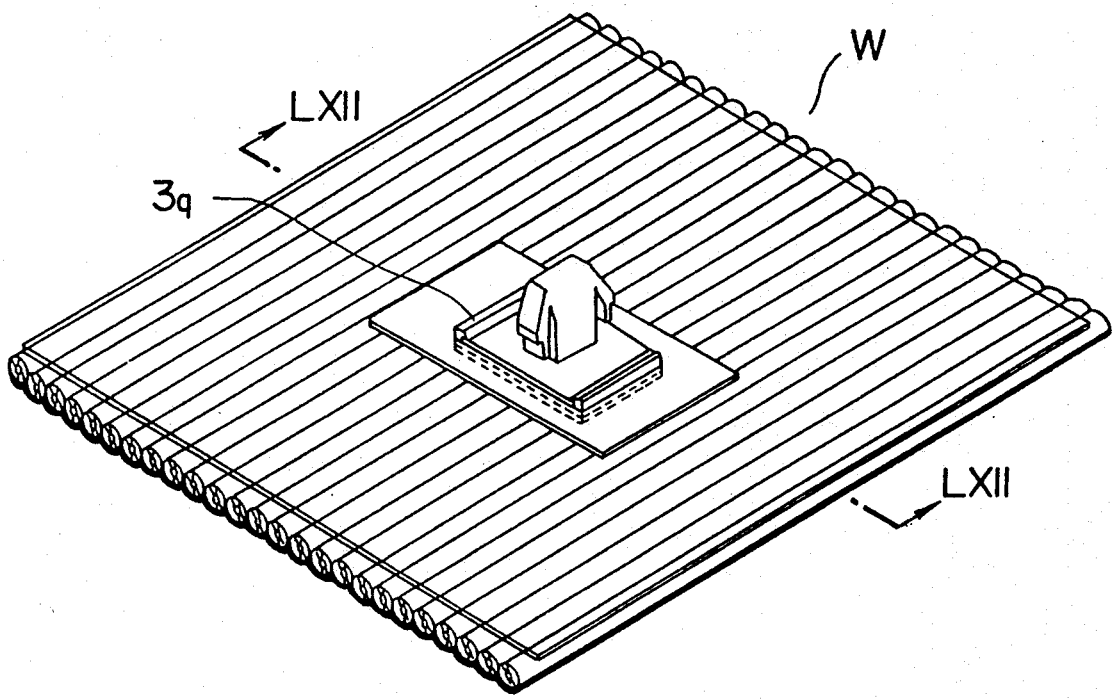
FIG. 61 is a perspective view of a still further embodiment of the present invention.
Figure 62:
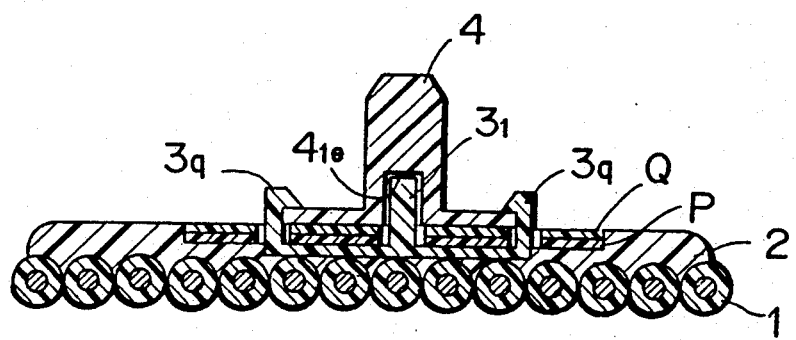
FIG. 62 is a cross section taken in the direction of line LXII—LXII of the embodiment shown in FIG. 61.
Figure 63:
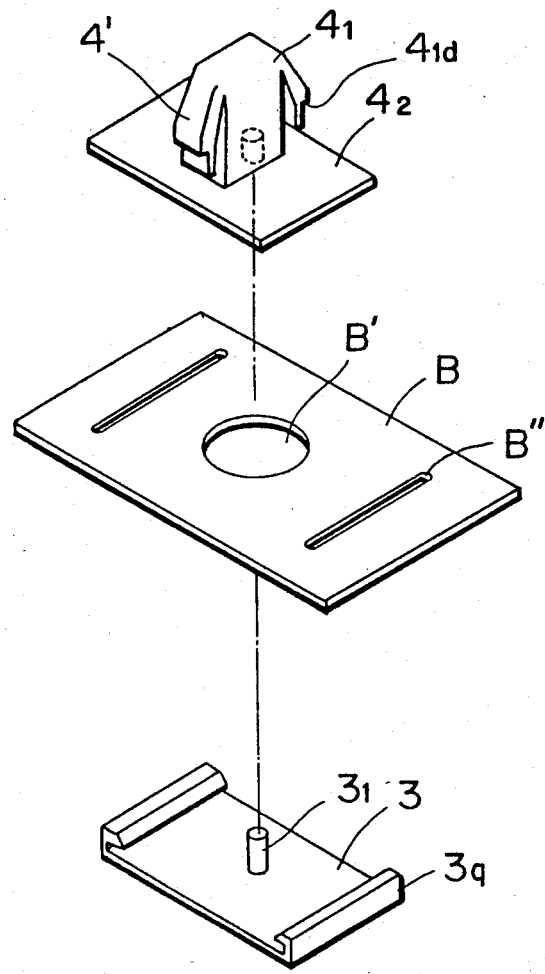
FIGS. 63A and 63B are exploded views of the above embodiment shown in FIG. 61.
Figure 63:
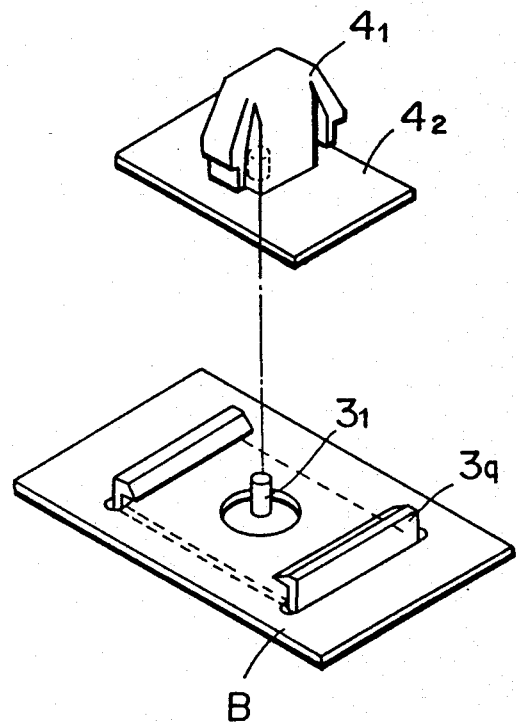

As shown in FIGS. 58 and 59, the wire harness W is composed of a plurality of conductor wires 1 arranged side by side and bound into a flat and integral structure by a synthetic resin insulation layer. The wires 1 are each composed of a conductor $1a$ and insulation covering $1b$ of polyvinyl chloride. Said insulation layer 2 is of the same material, that is, polyvinyl chloride or may be of a bonding agent, an adhesive sheet or the like.

The laminated sheet B is composed of a polyvinyl chloride layer and a synthetic resin of relatively high strength including polyester, polyamide resin (for example nylon) laminated thereon and is formed with a central opening B' therein. The base plate 3 has an area smaller than the laminated sheet B and is made of a synthetic resin of a relatively high strength such as polyacetal of 6-nylon to be integrally formed with a catch section $3_1$. Said catch section has bifurcated claw $3_2$.

The attaching plate $4_2$ is made of a material which is the same as the base plate 3 and their size is substantially equal. The clip 4' erected on the base plate $4_2$ has a hollow, tubular body $4_1$ and catch holes $4_{1b}$ at the upper end portions the side walls of the tubular body $4_1$. Said catch section $3_1$ is admitted into said tubular body $4_1$ such that said bifurcated claw $3_2$ is locked in the catch holes $4_{1b}$. On the other hand, the clip section 4 has a catch claw 4' having a shoulder section $4_{1d}$ at side walls provided perpendicular to said catch holes. Said catch claws 4' are designed to engage with a hole (not shown) formed in the vehicle body.

As shown in FIGS. 60A and 60B, the central hole B' in the laminated sheet B receives the catch section $3_1$ therethrough from the polyvinyl chloride layer side such that said catch section $3_1$ is inserted into the hollow tubular body $4_1$ of the clip 4 with the result that the bifurcated claw $3_2$ is locked into the catch holes $4_{1b}$. This completes the assembly of the base plate 3 and the attaching section 4 with the laminated sheet held therebetween to produce the attaching unit.

This attaching unit A is placed at a predetermined position on the insulation layer 2 of the flat wire harness W and when the laminated sheet B is heated, the polyvinyl chloride layer P thereof and the insulation layer 2 of the wire harness is fusion united with each other into an integral body. Said laminated sheet B is not susceptible to deformation or degradation due to heat fusion treatment because the polyvinyl chloride layer P thereof is reinforced by a heat resistive different kind of synthetic resin material layer Q.

Referring to FIGS. 61 through 63B, there is shown a still further embodiment of the invention. In the figures, the base plate 3 is formed with catch section $3q$ of elongated hook shaped structure at opposite ends thereof while it is provided with a positioning pin $3_1$ at a central portion thereof. The laminated sheet B is formed with slots B" for admitting catch sections $3q$ therethrough besides said central opening B'. On the other hand, the base plate $4_2$ is erected with a clip $4_1$ having a rectangular hollow body having an engaging recess $4_{1e}$ at its lower end. As in the foregoing embodiment, the bifurcated claw 4' has shoulder sections $4_{1d}$.

In the present embodiment, the catch sections $3q$ of the base plate 3 are admitted through the slots B" from below the laminated sheet B and when the attaching base plate $4_2$ is pressed against the sheet B and base plate $4_2$ with the positioning pin $3_1$ and the engaging recess $4_{1e}$ in contact, the opposite ends of the base plate $4_2$ come into engagement with the hook shaped catch sections $3q$, thus assembling the attaching unit A. Said attaching unit A is also fusion secured to the flat wire harness W as in the foregoing embodiment.

Figure 1:
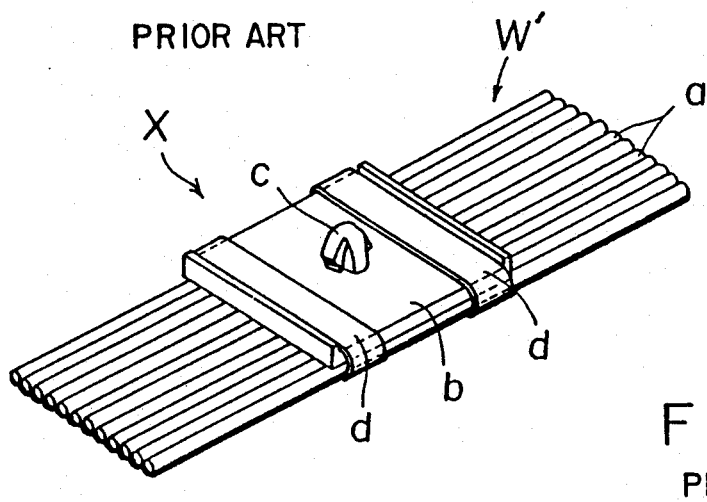
FIG. 1 is a perspective view of the conventional flat wire harness attaching unit which is united with a flat wire harness by means of tapes.
Figure 2:
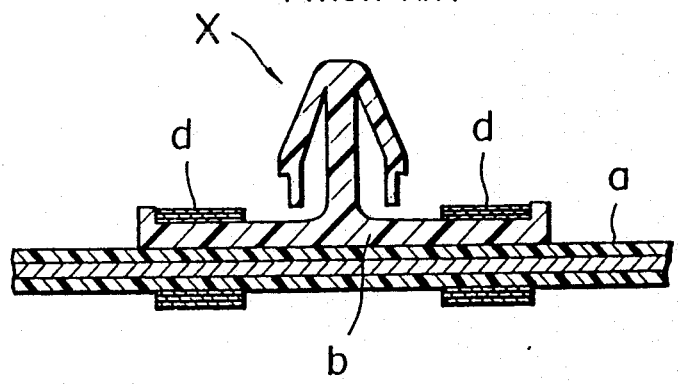
FIG. 2 is a cross section of FIG. 1.
Figure 64:
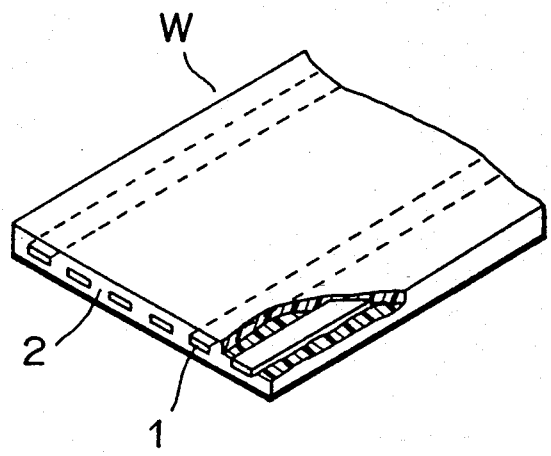
FIG. 64 is a still further type of flat wire harness.

Referring to FIG. 64, there is shown another modification of the flat wire harness W, in which ribbon shaped conductors 1 are arranged side by side and integrally molded with insulation layer 2 of polyvinyl chloride into a flat structure. Said wire harness W is, unlike an ordinary insulated wire 1 as shown in FIG. 1, arranged with a plurality of conductors 1 and secured side by side in a flat structure beforehand with the result that the aforementioned attaching unit is directly fusion secured thereto.

Needless to say, if the aforementioned insulation $1b$ and synthetic resin films 2 and 2' of the foregoing embodiments are formed of polyethylene or cross linked polyethylene, the polyvinyl chloride layer P of the laminated sheet B must also be replaced with a layer of polyethylene or cross linked polyethylene.

It is to be understood that the attaching unit of the present invention assures a firm attachment thereof to the flat wire harness and ensures that the flat wire harness is secured to a vehicle body notwithstanding vibrations over a long period of service. Further, the work of securing an attaching unit to the flat wire harness can be changed from manual work to an automatic operation, thus improving productivity.

What is claimed is:

1. A flat wire harness attaching unit for installing a flat wire harness formed of a plurality of wires covered with synthetic resin insulation, said plurality of wires being bundled and united into a flat integral structure having a first surface and a second surface by said synthetic resin insulation, said wire harness attaching unit comprising:

a clip section (4) provided for association with a vehicle body side;

a base section (3) formed integral with said clip section;

a planar securing member (B) made of a material capable of being made integral with said synthetic resin insulation of the flat wire harness through fusion and having an area larger than the base section, said planar securing member being formed with a central opening (B') therein through which said clip section extends, said planar securing member being adapted to secure said base section when fused with the first surface of the flat wire harness, said planar securing member further having a pair of apertures (B") on both sides of the opening; and spacer means (3g) connected to opposite ends of said base section and adapted to project through said pair of apertures in said planar securing member toward the vehicle body side for preventing said planar securing member from contacting a vehicle body.

2. A flat wire harness attaching unit according to claim 1, wherein said spacer means includes a pair of foldable cap members connected to the opposite ends of said base section.

3. A flat wire harness attaching unit according to claim 2, wherein said pair of foldable cap members are hinged (3h) to said opposite ends of the base section such that the foldable cap members are folded over the planar securing means.

4. A flat wire harness attaching unit according to claim 2, wherein said foldable cap members are formed with complementary lock means (3i, 3j) and opening means (3h) for avoiding interference with the clip section of the flat wire harness attaching unit.

5. A flat wire harness attaching unit according to claim 1, wherein said spacer means includes a pair of catch members formed at opposite ends of the base section.

6. A flat wire harness attaching unit according to claim 1, wherein said base section (3) is formed with apertures therein through which said wire harness (W) and planar securing member (B) are fused together.

7. A flat wire harness attaching unit according to claim 1, wherein said wire harness and the planar securing member each include a polyvinyl chloride layer.

8. A flat wire harness attaching unit according to claim 7, wherein there is provided a further polyvinyl chloride sheet immediately beneath and fused together to the polyvinyl chloride layer of said planar securing member and also fused to the polyvinyl chloride layer of the wire harness.

9. A flat wire harness attaching unit according to claim 1, wherein said pair of apertures in the planar securing member comprise slots.

10. A flat wire harness attaching unit according to claim 9, wherein said slots include elongate apertures open therealong.

11. A flat wire harness attaching unit according to claim 9, wherein said slots are closed at intermediate portions thereof with opposite ends thereof enlarged.

* * * * *